(12) United States Patent
Lee et al.

(10) Patent No.: US 10,466,852 B2
(45) Date of Patent: Nov. 5, 2019

(54) TOUCH 3D-SIGNAL INPUT EQUIPMENT AND MULTI-FUNCTION TOUCH PANEL

(71) Applicant: TPK Touch Solutions (Xiamen) Inc., Xiamen (CN)

(72) Inventors: Yuh-Wen Lee, Zhubei (TW); Feng Chen, Fuzhou (CN)

(73) Assignee: TPK Touch Solutions(Xiamen) Inc., Xiamen (CN)

( * ) Notice: Subject to any disclaimer, the term of this patent is extended or adjusted under 35 U.S.C. 154(b) by 238 days.

(21) Appl. No.: 15/229,078

(22) Filed: Aug. 4, 2016

(65) Prior Publication Data

US 2017/0045989 A1    Feb. 16, 2017

(30) Foreign Application Priority Data

Aug. 14, 2015    (CN) .......................... 2015 1 0501023

(51) Int. Cl.
   *G06F 3/041*    (2006.01)
   *G06F 3/045*    (2006.01)
   *G06F 3/044*    (2006.01)

(52) U.S. Cl.
   CPC .............. *G06F 3/045* (2013.01); *G06F 3/044* (2013.01); *G06F 3/0414* (2013.01)

(58) Field of Classification Search
   CPC ......... G06F 3/045; G06F 3/0414; G06F 3/044
   See application file for complete search history.

(56) References Cited

U.S. PATENT DOCUMENTS

| | | | | |
|---|---|---|---|---|
| 2003/0085882 | A1* | 5/2003 | Lu | G06F 3/0414 345/173 |
| 2013/0082970 | A1* | 4/2013 | Frey | G06F 3/0414 345/173 |
| 2015/0317019 | A1* | 11/2015 | Lee | G06F 3/044 345/174 |
| 2015/0331523 | A1* | 11/2015 | McMillen | G01L 1/18 345/174 |
| 2016/0098131 | A1* | 4/2016 | Ogata | G06F 1/1643 345/173 |
| 2016/0103545 | A1* | 4/2016 | Filiz | G01L 1/18 345/174 |
| 2017/0160829 | A1* | 6/2017 | Liu | G06F 3/044 |
| 2018/0164917 | A1* | 6/2018 | Seo | G06F 3/041 |

* cited by examiner

*Primary Examiner* — Lixi C Simpson
(74) *Attorney, Agent, or Firm* — Cooper Legal Group, LLC

(57) ABSTRACT

A touch 3D-signal input equipment and a multi-function touch panel are introduced. The touch 3D-signal input equipment includes a substrate, a plurality of signal sensing units, a plurality of input wires, and a plurality of output wires. The signal sensing units are arranged in array on the substrate to detect a plane position and a pressure magnitude of a touch signal simultaneously. The input wires and the output wires are electrically connected to any one of the signal sensing units and a signal processing unit, respectively. The touch 3D-signal input equipment can detect touch position and magnitude of the touch strength at the same time, achieving three dimensional (3D) signal input recognition.

16 Claims, 18 Drawing Sheets

TOUCH 3D-SIGNAL INPUT EQUIPMENT AND MULTI-FUNCTION TOUCH PANEL

RELATED APPLICATIONS

This application claims priority to Chinese Application Serial Number 201510501023.5, filed Aug. 14, 2015, which is herein incorporated by reference.

BACKGROUND

Technical Field

The present disclosure relates to input equipment. More particularly, the present disclosure relates to a touch 3D-signal input equipment and multi-function touch panel.

Description of Related Art

Touch panel technology has been progressively developed in recent years. Requirements for light weight, high transparency and narrow width have driven the touch panel technologies to significant improvement, causing progress in product thickness and function. Currently, resistive touch panels and capacitive touch panels can determine a coordinate position in the X-Y plane by touch sensing. Hence, integrating such a touch panel into a display allows control of application software.

Currently, some touch panels can detect pressure and plane position. In general, a pressure detecting equipment and a plane position detecting equipment are produced respectively. In such a touch panel using a pressure sensor to sense a touch pressure, the pressure sensor is an independent component attached to a touch sensor, such that the touch pressure is not directly sensed. For the pressure sensor, a resistive film or piezoelectric film is widely used. The use of space and the simplification of process still need a strong improvement in various technologies.

SUMMARY

To overcome the problem that pressure sensing electrodes and touch sensing electrodes need to be respectively arranged to achieve 3D-signal input in the current technologies, the disclosure provides a touch 3D-signal input equipment and a touch panel that can achieve a double detection that detects touch strength and touch position with only one device.

An embodiment of the disclosure relates to a touch 3D-signal input equipment. The touch 3D-signal input equipment includes a substrate, a plurality of signal sensing units, a plurality of input wires, and a plurality of output wires. The signal sensing units are arranged in array on the substrate to simultaneously detect plane position and pressure magnitude of a touch signal. The input wires and output wires are electrically connected to any one of the signal sensing units and a signal processing unit, respectively.

Another embodiment of the disclosure relates to an application method of the aforementioned touch 3D-signal input equipment. The method begins at setting a reference. The touch 3D-signal input equipment undergoes a touch, and the touched signal sensing units are deformed. Signal scanning is performed sequentially or simultaneously to detect a resistance or a capacitance of the deformed signal sensing units, and compare the resistance or the capacitance to the reference. Each of the signal variations of the signal sensing units is used to calculate a touch strength and a touch position according to predetermined formulas.

Another embodiment of the disclosure relates to a multi-function panel. The multi-function panel includes a protective shield, a biological recognition system, and the aforementioned touch 3D-signal input equipment, in which the biological recognition system is disposed between the protective shield and the touch 3D-signal input equipment.

Compared to the current technologies, the touch 3D-signal input, equipment respectively connects the input wires and the output wires to the signal processing unit by forming several signal sensing units on the substrate. Since the received signal is processed and determined by the signal processing units, which can simultaneously detect 3D-signal (touch position and pressure magnitude), a combination of touch sensing and pressure sensing is achieved that not only saves materials but also extends product function, enhancing experience of the user.

The present disclosure further based on the above content, adds a biological recognition structure, which can increasingly provide better experience to the user and does not interfere with the signal transmission of the touch 3D-signal input equipment.

DETAILED DESCRIPTION

To clarify and simplify the purpose, technologies and advantages of the present disclosure, detailed description is followed with several figures and embodiments. It is noted that the described embodiments herein are merely used to explain, but not to limit, the present disclosure.

Figure 1:
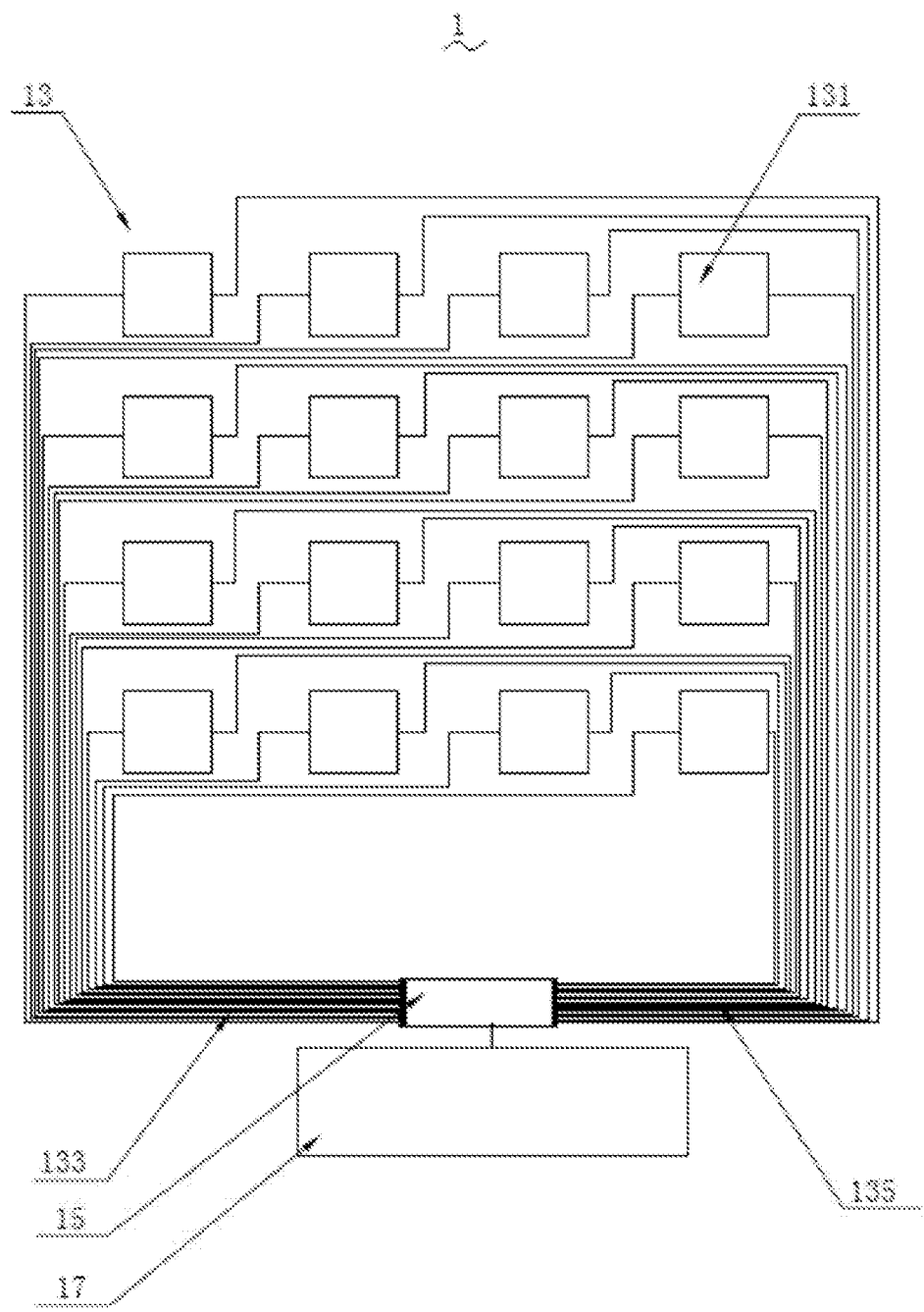
FIG. 1 is a schematic view of a touch 3D-signal input equipment according to at least one embodiment of the present disclosure.
Figure 2:
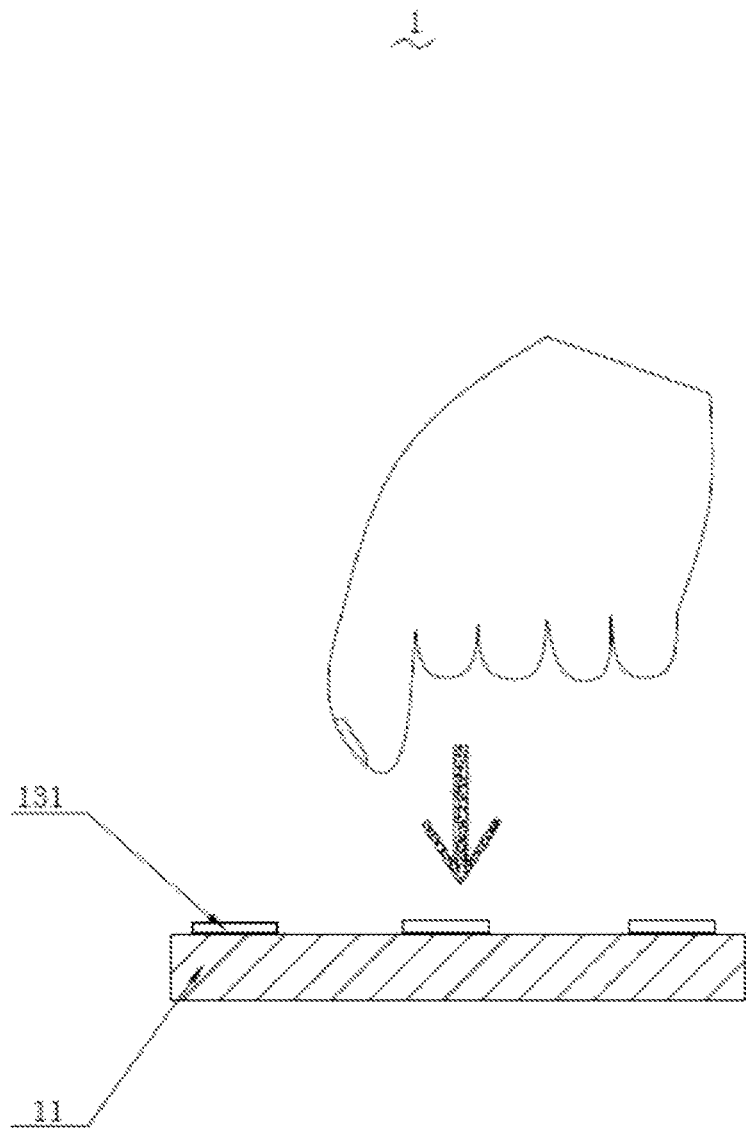
FIG. 2 is a cross-sectional view of the touch 3D-signal input equipment according to at least one embodiment of the present disclosure.
Figure 3:
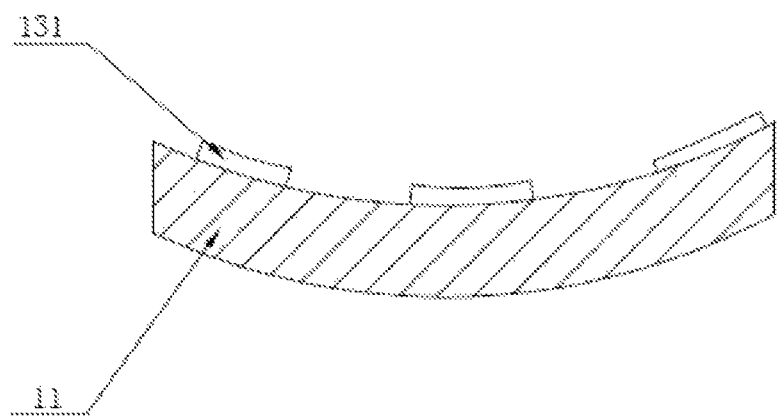
FIG. 3 is a cross-sectional view of the touch 3D-signal input equipment after deformed according to at least one embodiment of the present disclosure.

Referring to FIGS. 1, 2 and 3, a touch 3D-signal input equipment 1 includes a substrate 11 and a signal sensing layer 13 formed on the substrate 11. The signal sensing layer 13 includes a plurality of signal sensing units 131 arranged in array, and the signal sensing layer 13 is formed on the substrate 11 by imprinting, silk printing, etching coating, or the like. When the user applies a touch to the substrate 11, the substrate 11 is deformed and the signal sensing layer 13 on the substrate 11 is also deformed accordingly. Due to the deformation caused by touching, the signal sensing layer 13 can send back a plane position at a touch point, and send back a pressure magnitude according to the deformation.

Through use of the signal sensing layer 13, when a device is externally pressed or touched, it is possible to detect touch position and pressure magnitude simultaneously, achieving 3D-signal detection at the same time.

The touch 3D-signal input equipment 1 further includes a plurality of input wires 133, a plurality of output wires 135, an FPC (flexible circuit board) 15, and a detecting chip 17, in which the number of the input wires 133 is equal to the number of the signal sensing units 131, and the number of the output wires 135 is equal to the number of signal sensing units 131. Each of the signal sensing units 131 is electrically connected to one of the input wires 133 and one of the output wires 135, respectively. Each of the input wires 133 and each of the output wires 135 are connected to the FPC 15. Therefore, each of the signal sensing units 131 forms a circuit with one input wire 133, one output wire 135 and the FPC 15, achieving signal transmission. The FPC 15 is connected to the detecting chip 17. While applying external pressure to the touch 3D-signal input equipment 1 of the disclosure, the touch information can be transmitted immediately to the detecting chip 17 by the input wires 133, output wires 135 and FPC 15. As a processing unit, the detecting chip 17 can further calculate and process detected signals.

Different magnitudes of touch strength can produce different signal outputs. Through processing by the detecting chip 17, different functional operations can be achieved, such that design can greatly improve product experience and satisfaction of the user. The substrate 11 can be hard material, such as glass, tempered glass, sapphire glass, or the like; soft material, such as polyetheretherketone (PEEK), polyimide (PI), polyethylene terephthalate (PET), Polycarbonate (PC), polymethylmethacrylate (PMMA), poly ethylene succinate (PES), or a combination thereof.

Figure 4:
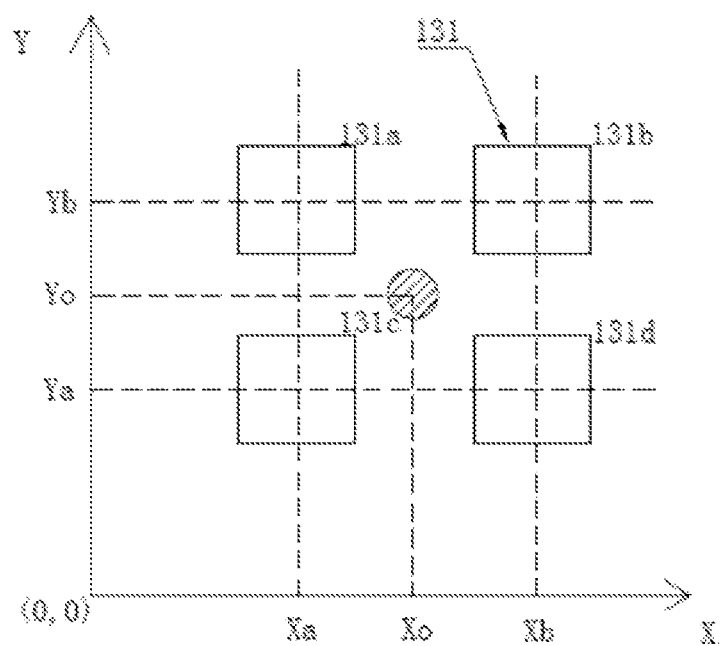
FIG. 4 is a schematic view of detected coordinate position of the touch point of a touch 3D-signal input equipment.

However, the touch position is not always located right above the signal sensing units 131. Therefore, to calculate an accurate touch position, it is necessary to combine the detected touch signal with predetermined formulas to determine the touch position. After obtaining the accurate touch position, the subsequent function can be executed accurately. Further referring to FIG. 4, for example, with four signal sensing units 131a, 131b, 131c, and 131d arranged uniformly, the touch point (Xo,Yo) is located among four signal sensing units 131a, 131b, 131c, and 131d. The coordinates of each of the signal sensing units 131a, 131b, 131c, and 131d are shown in FIG. 4, where $\Delta m1$, $\Delta m2$, $\Delta m3$, $\Delta m4$ are signal variations corresponding to the signal sensing units 131a, 131b, 131c, and 131d. When the touch point is located among the adjacent signal sensing units 131a, 131b, 131c, and 131d, and results in signal variations of the signal sensing units 131a, 131b, 131c, and 131d, the predetermined formulas are $Xo=(\Delta m1 \times Xa + \Delta m2 \times Xb)/(\Delta m1 + \Delta m2)$ or $Xo=(\Delta m3 \times Xa + \Delta m4 \times Xb)/(\Delta m3 + \Delta m4)$, $Yo=(\Delta m1 \times Yb + \Delta m3 \times Ya)/(\Delta m1 + \Delta m3)$ or $Yo=(\Delta m2 \times Yb + \Delta m4 \times Ya)/(\Delta m2 + \Delta m4)$, wherein Xa, Xb, Xo, Ya, Yb, and Yo are coordinates. The magnitude of touch strength can be determined by a formula: $\Delta m=(\Delta m1 + \Delta m2 + \Delta m3 + \Delta m4)$. Alternatively the magnitude of touch strength can be determined by a formula: $\Delta m=(\Delta m1 + \Delta m2 + \Delta m3 + \Delta m4)/4$.

Figure 5:
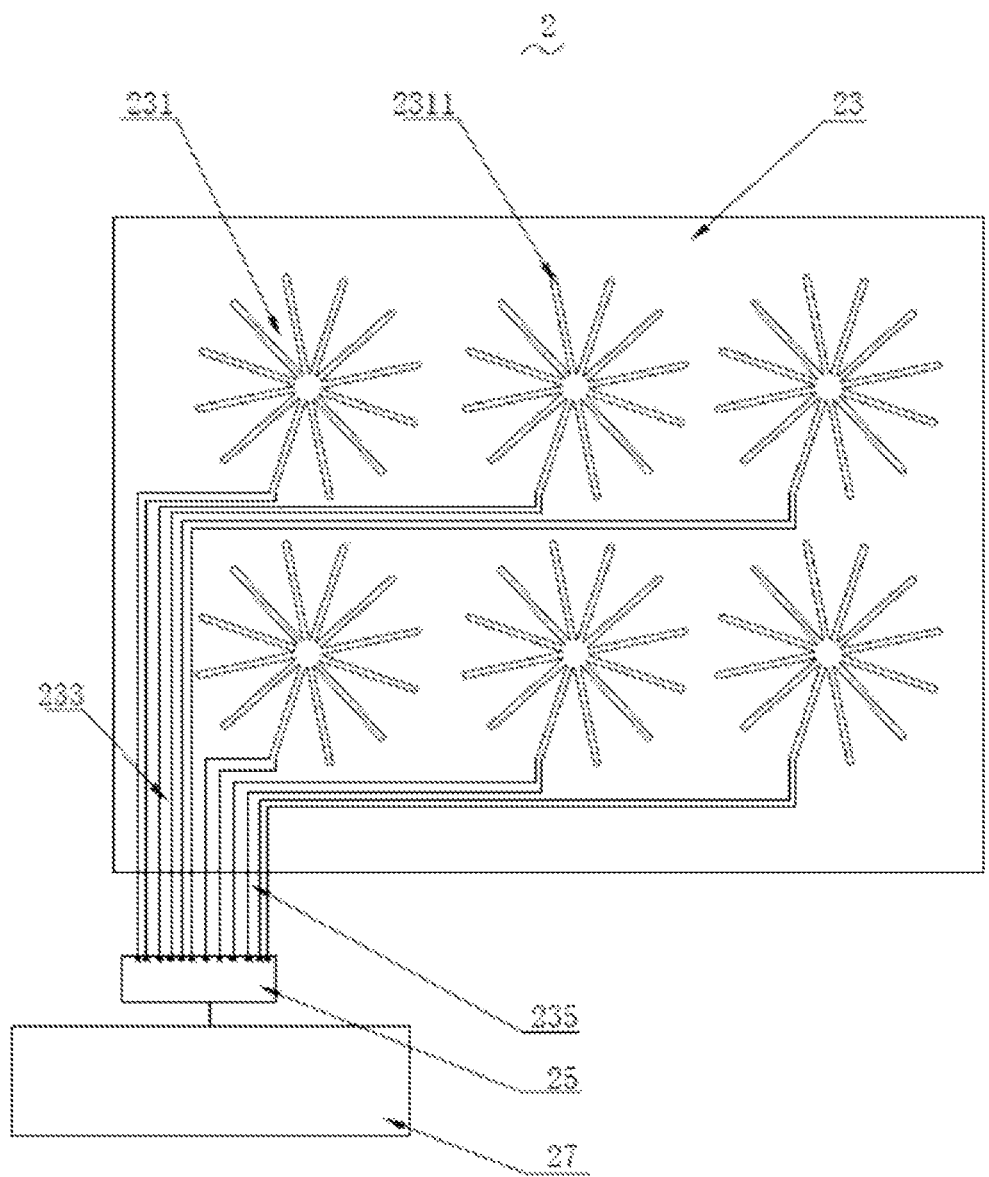
FIG. 5 is a schematic view of a touch 3D-signal input equipment according to at least one embodiment of the present disclosure.

Referring to FIG. 5, a touch 3D-signal input equipment 2 with resistive detection principle is shown. Resistive detection principle means that the detected signal is a resistance signal when detecting variations of each of the signal sensing units, in which $\Delta m$ is resistance variation.

In some embodiments, a signal sensing layer 23 of the touch 3D-signal input equipment 2 includes a plurality of signal sensing units 231 arranged in array. In some embodiments, each of the signal sensing units 231 is formed by a radially-bended wire, each pattern of radially-bended wire of the signal sensing units 231 includes various signal sensing unit projection parts 2311, and each of the signal sensing unit projection parts 2311 spreads from middle to outside of the signal sensing units 231. In some embodiments, the wire width ranges from 3 μm to 500 μm, and the size of the bended signal sensing units 211 ranges from 25 mm² to 225 mm². The opposite sides of the wire of signal sensing units 231 are connected to an FPC 25 by an input wire 233 and an output wire 235, and the FPC 25 is electrically connected to a detecting chip 27. In some embodiments, the input wire 233, the output wire 235, and the wire of the signal sensing units are made of identical material in a single process.

The material of the signal sensing units 231, the input wire 233, and the output wire 235 can be: ITO, silver nanowire, copper nanowire, graphene, poly(3,4-ethylenedioxythiophene) (PEDOT), polystyrene sulfonate (PSS) transparent conductive polymer, carbon nanotube or the like. After receiving external pressure, the signal sensing units 231 induce resistance variation, and the system detects position and pressure according to the resistance variation of the signal sensing units 231.

The radially arranged signal sensing units 231 are goad at sensing external pressure and are easy to deform, contributing to detecting pressure magnitude.

Figure 6:
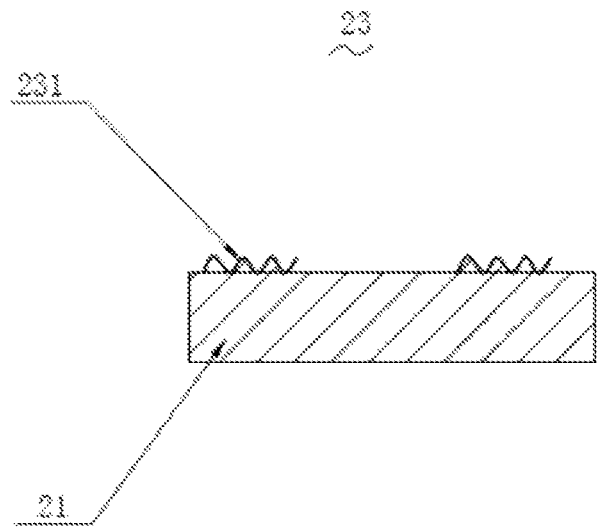
FIG. 6 is a cross-sectional view of the touch 3D-signal input equipment according to at least one embodiment of the present disclosure.
Figure 7:
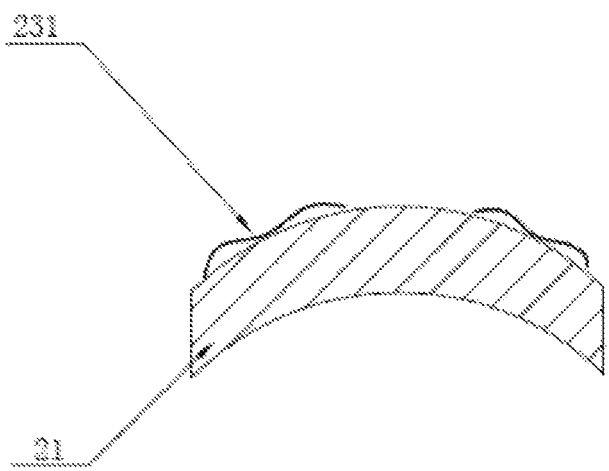
FIG. 7 is a cross-sectional view of the touch 3D-signal input equipment after deformed according to at least one embodiment of the present disclosure.

Reference is made to FIGS. 6 and 7. Before receiving external pressure, the substrate 21 of the touch 3D-signal input equipment 2 is flat, and the signal sensing units 231 disposed on the substrate 21 are flexible. After receiving external pressure, the substrate 21 and each of the signal sensing units 231 disposed on the substrate 21 are deformed. Due to the deformation, the resistance of signal sensing, units 231 is different from the initial value. The system can calculate a touch position and a pressure magnitude by detecting resistance variation (with respect to the initial value previously stored), achieving 3D-signal input.

Figure 8:
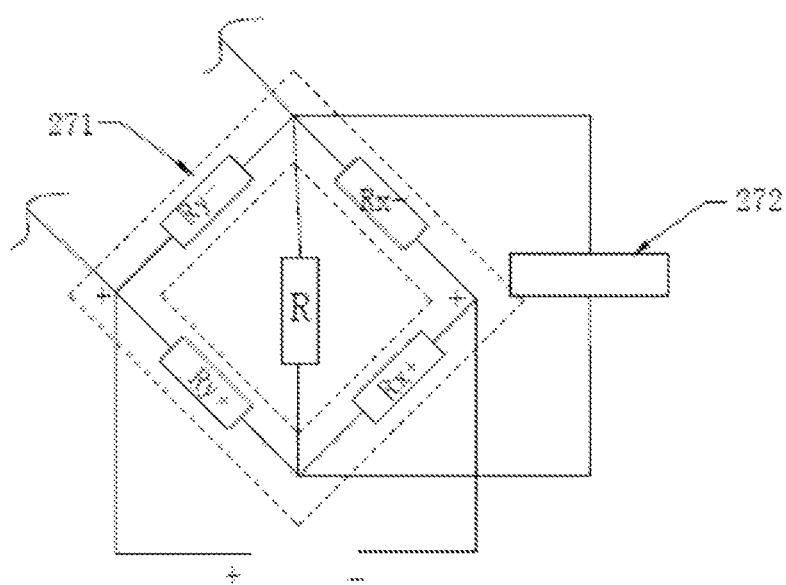
FIG. 8 is a schematic view of a detecting circuit of the touch 3D-signal input equipment according to at least one embodiment of the present disclosure.

Further referring to FIG. 8, the detecting chip 27 includes a touch position detecting circuit 271 and a touch strength detecting circuit 272. The touch position detecting circuit 271 includes resistance Rx+ and Rx−, Ry+ and Ry− arranged in series, and the touch strength detecting circuit 272 is connected to the touch position detecting circuit. A first terminal of resistance Rx+ is electrically connected to a first terminal of resistance Ry+. A second terminal of resistance Rx+ is electrically connected to a first terminal of resistance Rx−. A second terminal of resistance Rx− is electrically connected to a first terminal of resistance Ry−. A second terminal of resistance Ry− is electrically connected to a second terminal of resistance Ry−. A second terminal of resistance Rx− and a first terminal of resistance Ry− are electrically connected to a first terminal of the touch strength detecting circuit 272. A first terminal of resistance Rx+ and a first terminal of resistance Ry+ are electrically connected to a second terminal of the touch strength detecting circuit 272. After applying a driving voltage to the system, the touch position detecting circuit and the touch strength detecting circuit 272 can detect and process the signal at the same time, obtaining touch point information and pressure magnitude information.

Figure 9:
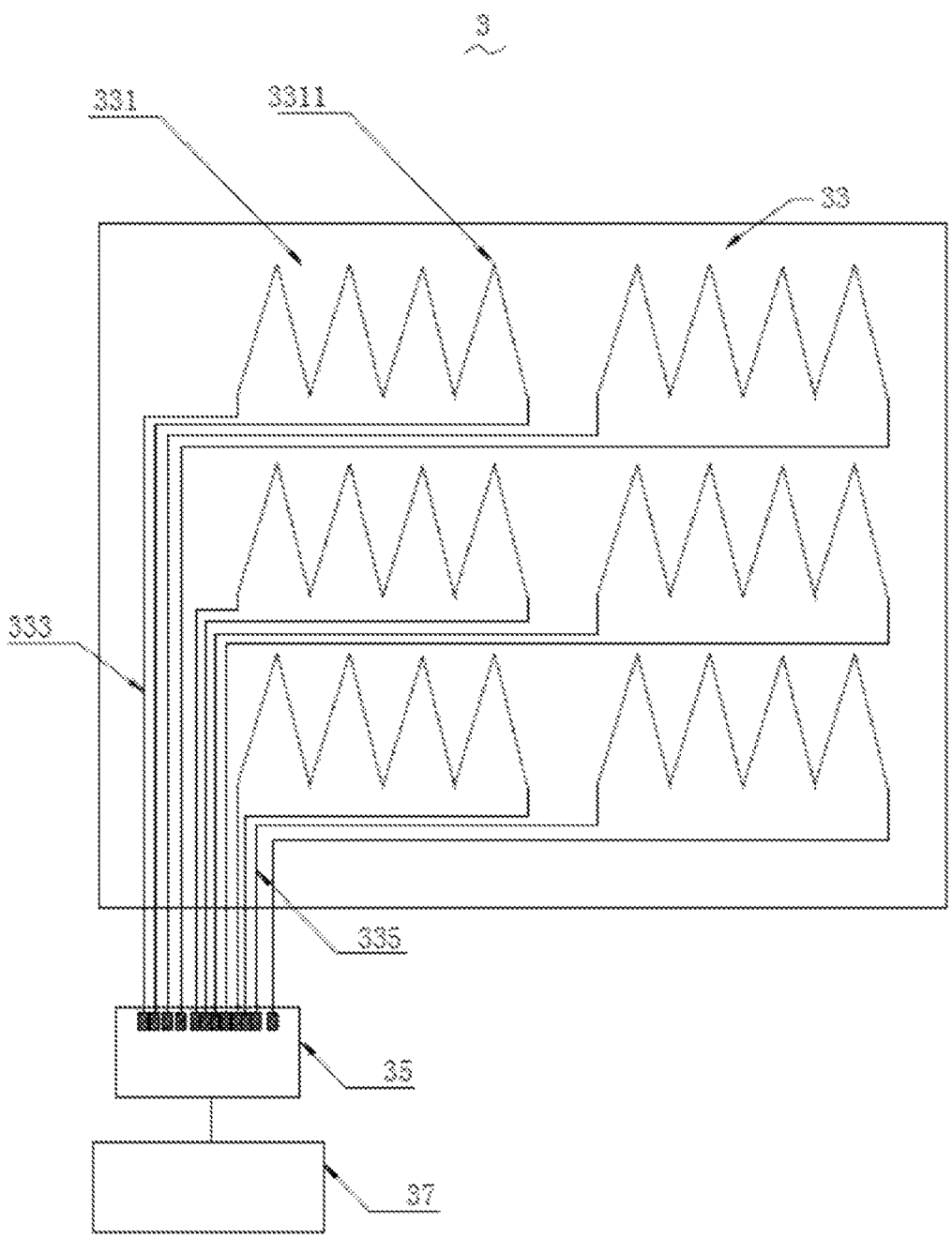
FIG. 9 is a schematic view of signal sensing units of a touch 3D-signal input equipment according to at least one embodiment of the present disclosure.

Reference is made to FIG. 9. Similarly, a touch 3D-signal input equipment 3 with resistive detection principle is shown. A signal sensing layer 33 of the touch 3D-signal input equipment 3 includes a plurality of signal sensing units 331. The opposite sides of the wire of the signal sensing units 331 are connected to a FPC 35 by an input wire 333 and an output wire 335, and the FPC 35 is electrically connected to a detecting chip 37. The difference between this configuration and that shown in FIG. 5 includes that each of the signal sensing units 331 is arranged in jagged shape by a single wire. Each of the jagged shape signal sensing units 331 includes four identical jagged parts 3311. Of course, the number of jagged parts 3311 may be flexibly modified according to the actual situation, and should not be limited to four.

Figure 10:
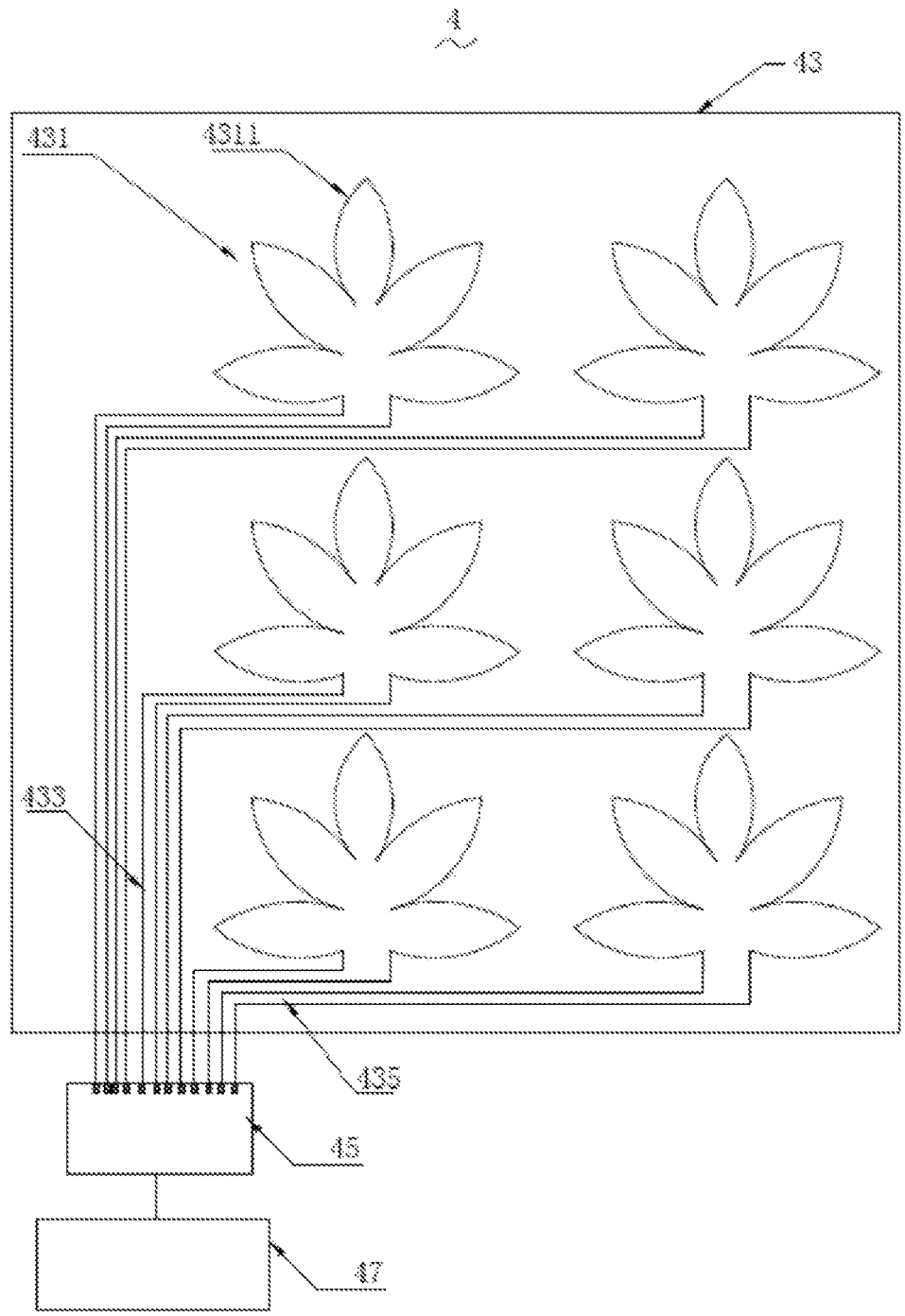
FIG. 10 is a schematic view of signal sensing units of a touch 3D-signal input equipment according to at least one embodiment of the present disclosure.

Reference is made to FIG. 10. A touch 3D-signal input equipment 4 with resistive detection principle is shown. A signal sensing layer 43 of the touch 3D-signal input equipment 4 includes a plurality of signal sensing units 431. The opposite sides of the wire of the signal sensing units 431 are connected to a FPC 45 by an input wire 433 and an output wire 435, and the FPC 45 is electrically connected to a detecting chip 47. The difference between the configuration shown and that in FIG. 9 includes that each of the signal sensing units 331 is arranged in a flower shape by a wire, wherein the number of petal parts 4311 may be flexibly modified according to the actual situation, and should not be limited to five. Such similar patterns will not be described in this disclosure.

Figure 11:
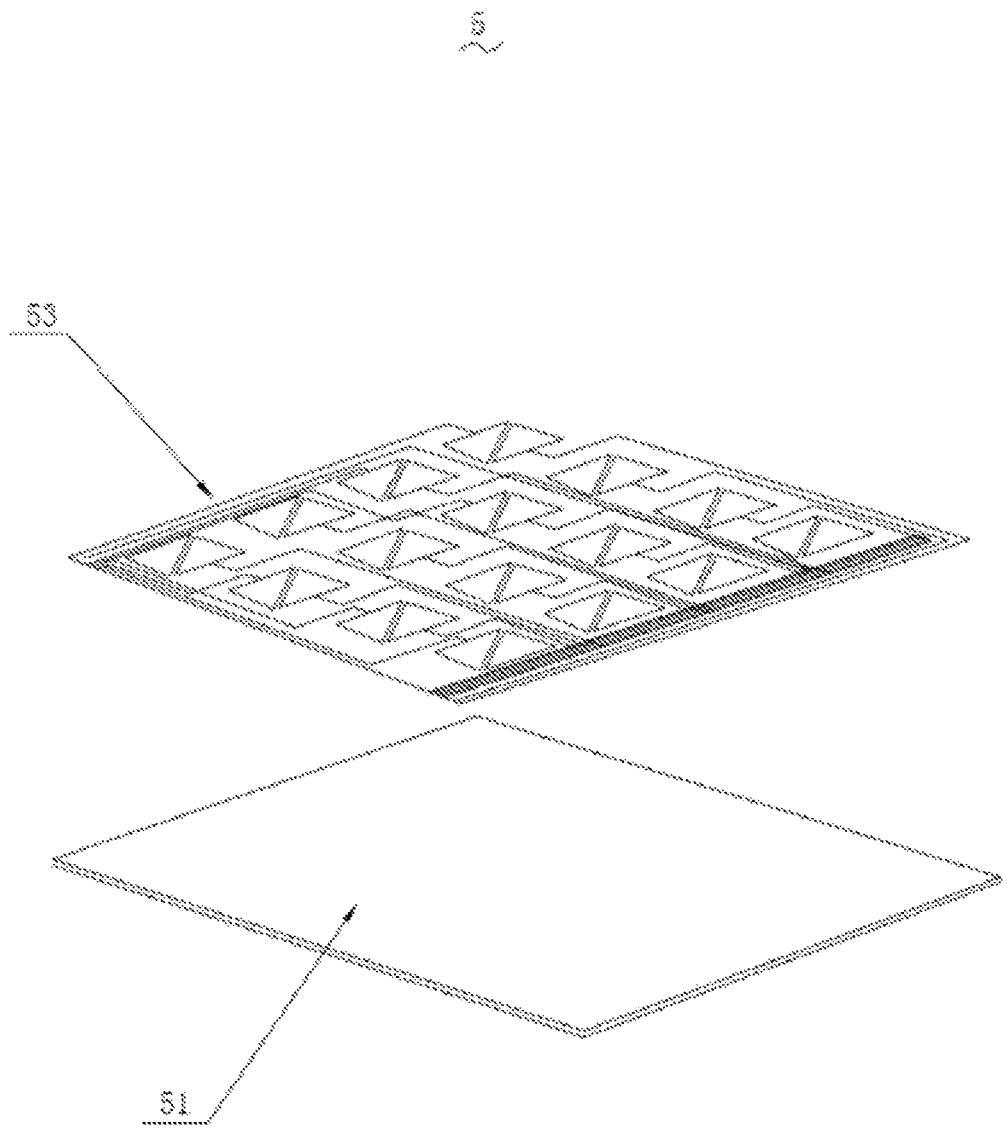
FIG. 11 is an explosion view of a touch 3D-signal input equipment according to a least one embodiment of the present disclosure.
Figure 12:
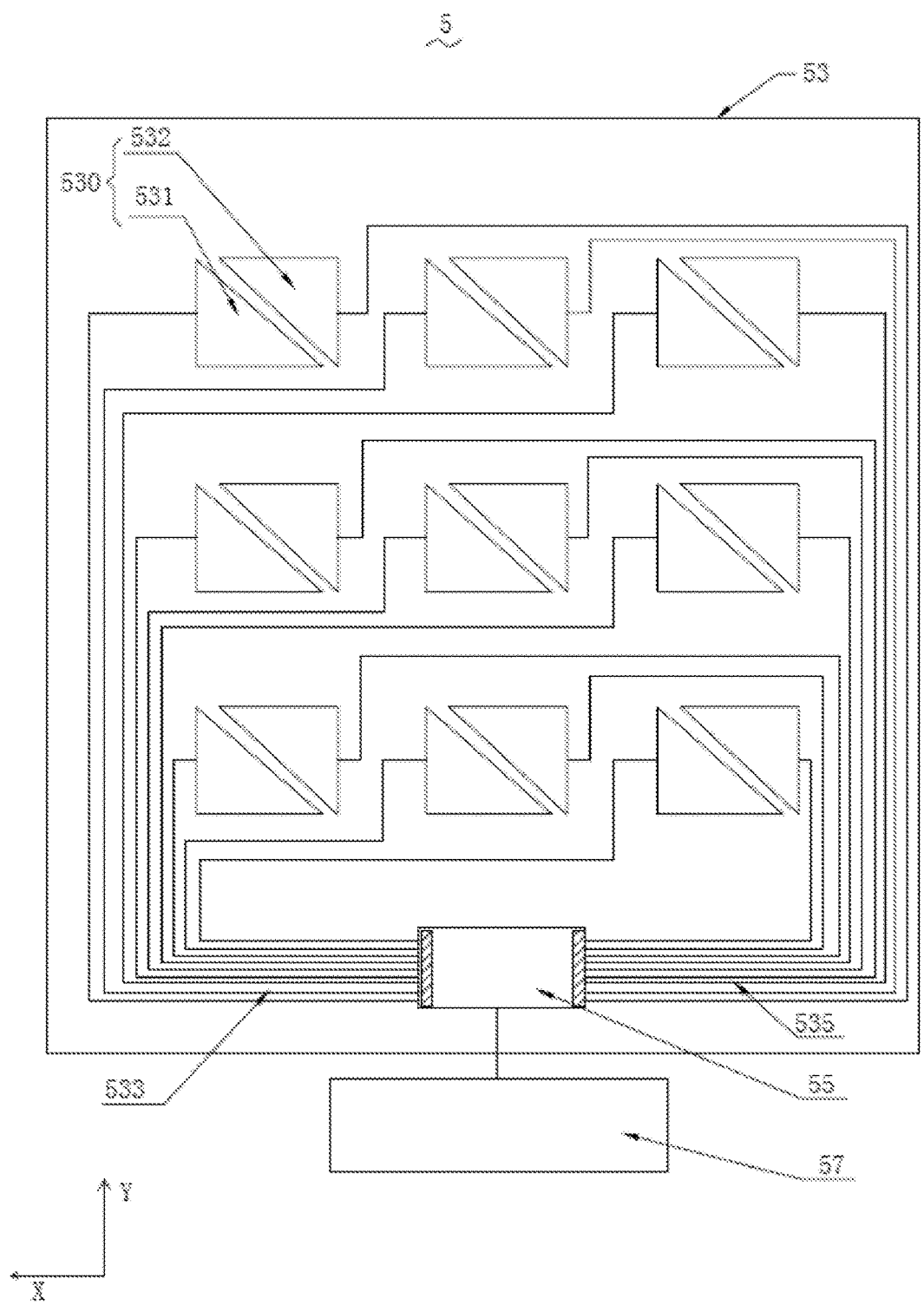
FIG. 12 is a schematic view of signal sensing units of the touch 3D-signal input equipment according to at least one embodiment of the present disclosure.

Reference is made to FIGS. 11 and 12. A touch 3D-signal input equipment 5 with capacitive detection principle is shown. Capacitive detection principle means that when detecting each signal variation of signal sensing units, the detected signal is a capacitance signal, in which $\Delta m$ is capacitance variation.

In this configuration, the touch 3D-signal input equipment 5 includes a substrate 51 and a signal sensing layer 53 disposed on the substrate 51. The signal sensing layer 53 includes a plurality of signal sensing units 530. In some embodiments, each of the signal sensing units 530 includes a signal emitting electrode 531 and a signal receiving electrode 532, the shape of signal emitting electrode 531 and the shape of signal receiving electrode 532 are identical triangles and are disposed adjacent to each other, and the distance therebetween is d1. In some embodiments, the distance d1 ranges from 5 μm to 20 μm. If the distance d1 is less than 5 μm, the distance between the signal emitting electrode 531 and the signal receiving electrode 532 may be incompletely etched during the etching process, leading to electrical connection. If the distance d1 is larger than 20 μm, the coupled capacitance between the signal emitting electrode 531 and the signal receiving electrode 532 may be too small and hard to be measured. The signal emitting electrode 531 and the signal receiving electrode 532 are connected to an FPC 55 through an input wire 533 and an output wire 535, achieving, electrical connection. The FPC 55 is electrically connected to a detecting chip 57.

Figure 13:
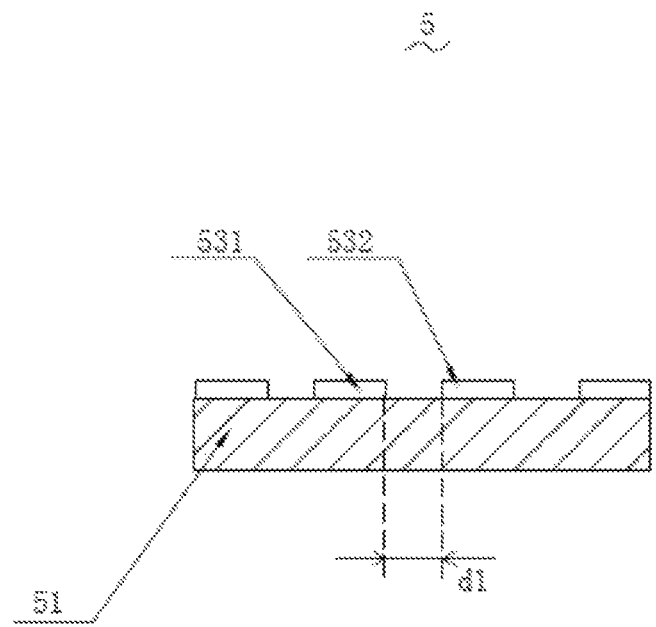
FIG. 13 is a cross-sectional view of a sensing electrode of the touch 3D-signal input equipment according to at least one embodiment of the present disclosure.
Figure 14:
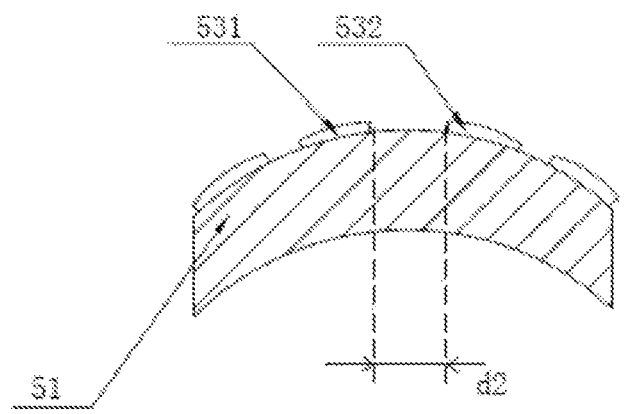
FIG. 14 is a cross-sectional view of the touch 3D-signal input equipment after deformed according to at least one embodiment of the present disclosure.

Reference is made to FIGS. 13 and 14. When there is no external pressure, the touch 3D-signal input equipment 5 is at a free state, the distance between the corresponding signal emitting electrode 531 and the corresponding signal receiving electrode 532 is d1, and a mutual capacitance is present therebetween. Charges are emitted from the signal emitting electrode 531 and are received at signal receiving electrode 532. While applying a touch to the touch 3D-signal input equipment 5, the distance d1 between the signal emitting electrode 531 and the signal receiving electrode 532, which were initially disposed at the same plane, changes to d2 due to the deformation of the substrate 51, as shown in FIG. 14. The distance change affects the coupled capacitance between the signal emitting electrode 531 and the signal receiving electrode 532, thereby resulting in capacitance variation. The system calculates the difference between the default capacitance and the post-touched capacitance, obtaining a pressure magnitude and a touch position, thereby achieving 3D-signal input.

Figure 15:
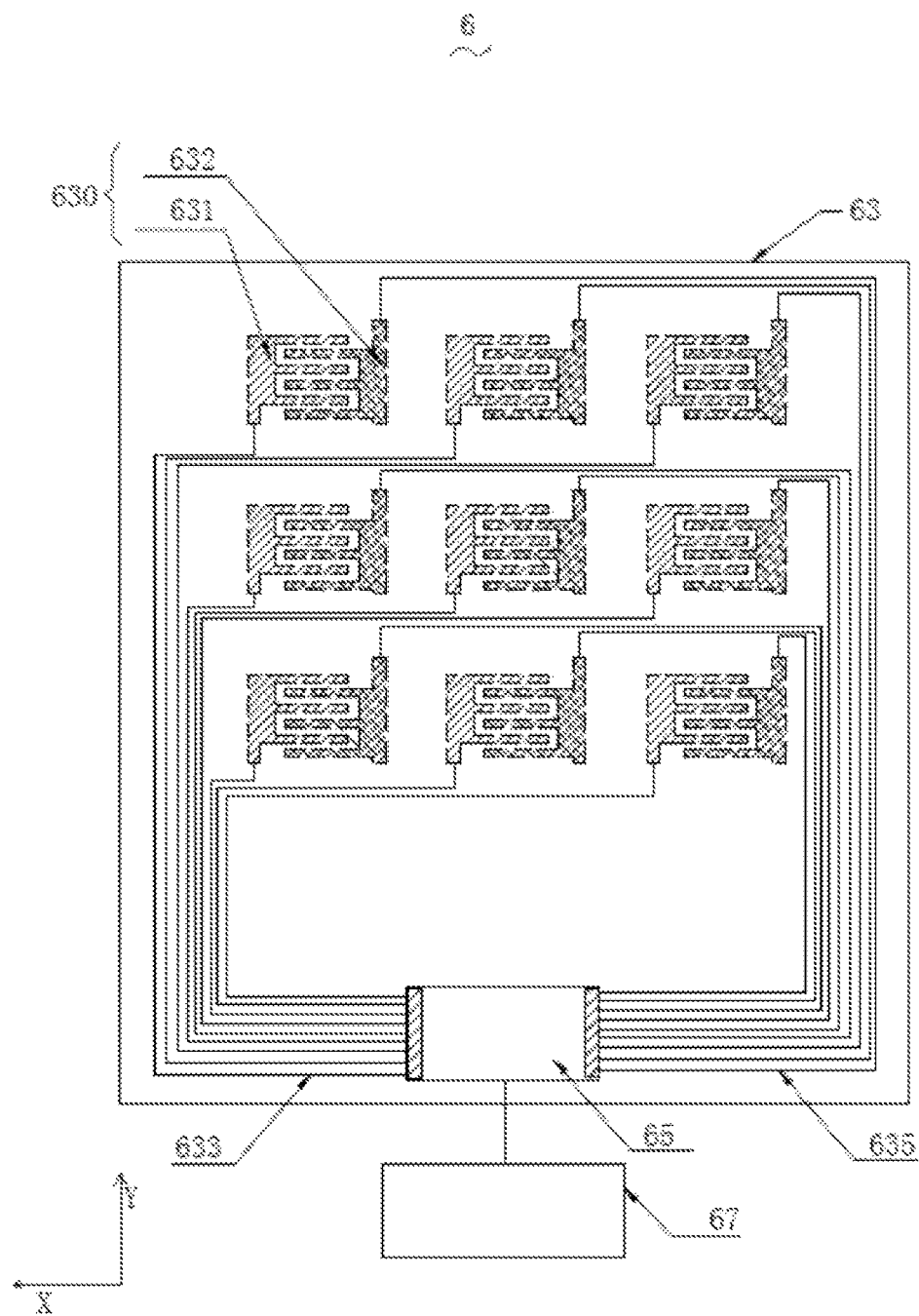
FIG. 15 is a schematic view of signal sensing units of a touch 3D-signal input equipment according to at least one embodiment of the present disclosure.
Figure 16:
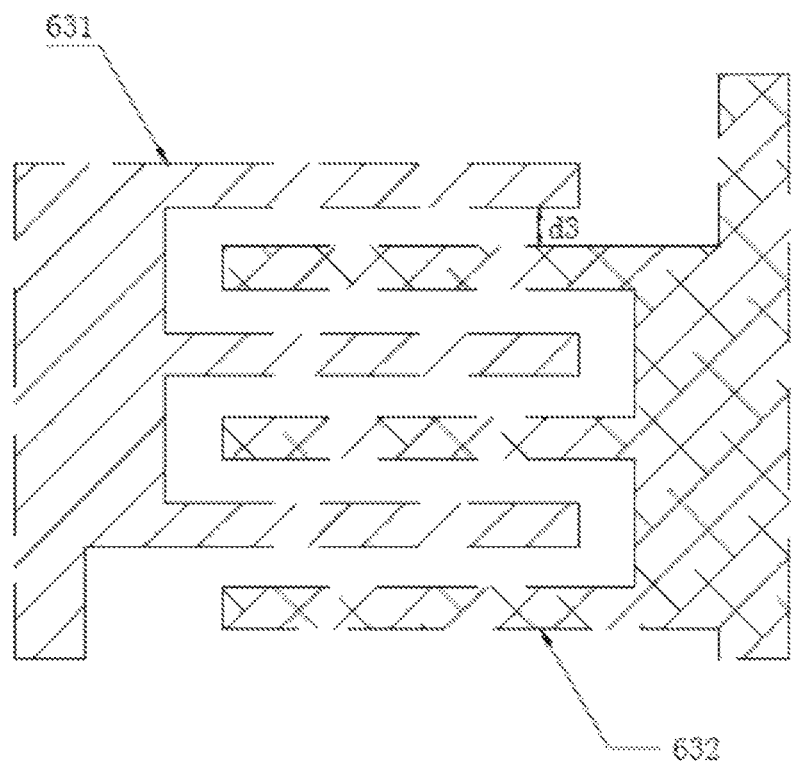
FIG. 16 is a schematic view of one signal sensing unit of the touch 3D-signal input equipment in FIG. 15.

Reference is made to FIG. 15 and FIG. 16. A touch 3D-signal input equipment 6 with capacitive detection principle is shown. A signal sensing layer 63 of the touch 3D-signal input equipment 6 includes a plurality of signal sensing units 630 arranged in array. Each of the signal sensing units 630 includes a signal emitting electrode 631 and a signal receiving electrode 632. The difference between this configuration and that shown in FIG. 12 includes that the signal emitting electrode 631 and the signal receiving electrode 632 are disposed in an interleaved-comb arrangement. As, shown in FIG. 16, each comb structure has a plurality of comb teeth. The comb tooth of the signal emitting electrode 631 and the comb tooth of the adjacent signal receiving electrode 632 have a distance d3 therebetween. The distance d3 ranges from 5 μm to 20 μm, and forms a coupled capacitance. Because each of the signal emitting electrodes 631 and each of the signal receiving electrodes 632 have several interleaved comb teeth, each of the signal sensing units 630 acts like several capacitances in parallel. The signal emitting electrode 631 and the signal receiving electrode 632 are connected to an FPC 65 through an input wire 633 and an output wire 635, achieving electrical connection. The FPC 65 is electrically connected to a detecting chip 67. Similar to the configuration of FIG. 12, after touching the touch 3D-signal input equipment 6, the substrate is deformed, and at least one coupled capacitance varies due to the distance change between two comb teeth, which is then detected by the system. Compared to the configuration of FIG. 12, the interleaved structure has a stronger capacitance signal and is more sensitive.

Figure 17:
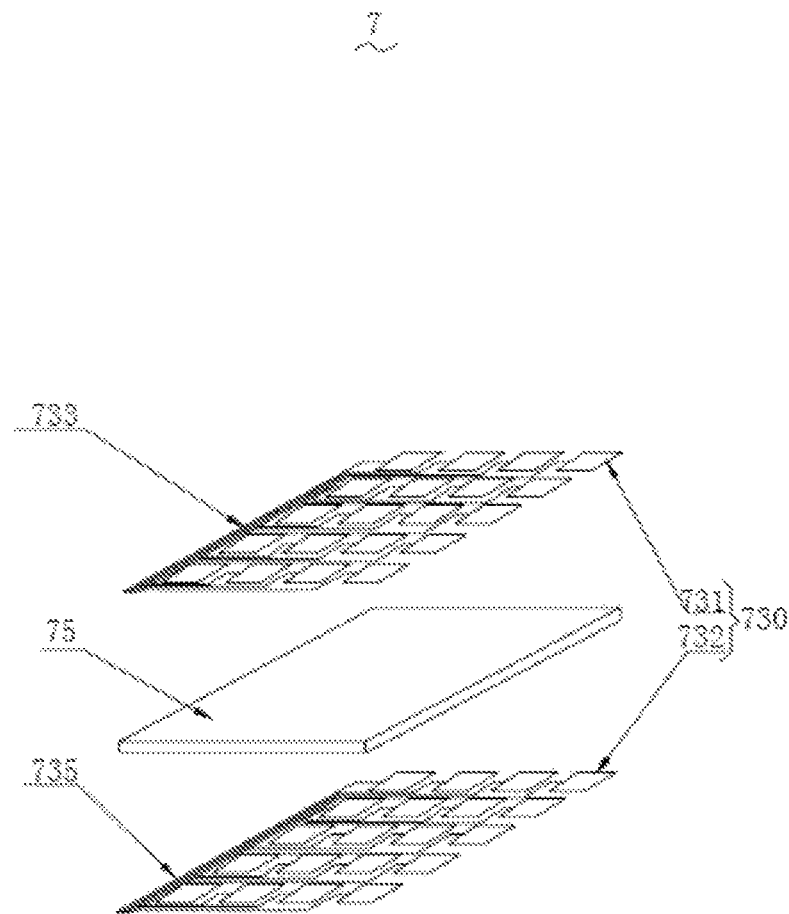
FIG. 17 is an explosion view of a touch 3D-signal input equipment according to at least one embodiment of the present disclosure.
Figure 18:
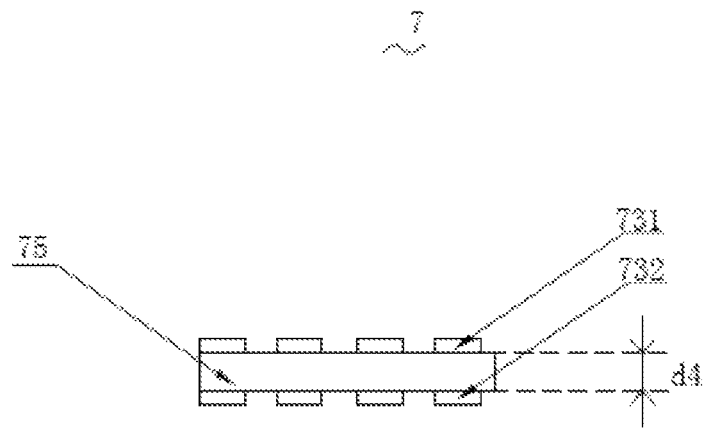
FIG. 18 is a cross-sectional view of the touch 3D-signal input equipment according to at least one embodiment of the present disclosure.

Reference is made to FIG. 17. A touch 3D-signal input equipment 7 with capacitive detection principle is shown. The difference between this configuration and configurations of FIG. 12 and FIG. 15 includes that the touch 3D-signal input equipment 7 includes a substrate 75 and a plurality of signal sensing units 730. Each of the signal sensing units 730 includes a signal emitting electrode 731 and a signal receiving electrode 732, and the signal emitting electrode 731 and the signal receiving electrode 732 are present on opposite surfaces of the substrate 75, respectively. Each signal emitting electrode 731 is connected to an input wire 733, and each signal receiving electrode 732 is connected to an output wire 735. In some embodiments, the size of the signal emitting electrode 731 and the size of the signal receiving electrode 732 ranges from about 25 $mm^2$ to 225 $mm^2$, and their vertical projections overlap each other. In some other embodiments, the substrate 75 is made of soft material, and some of the soft material, which is specifically designed, is flexible. The substrate 75 has a thickness d4 (as shown in FIG. 18). The thickness d4 ranges from 50 μm to 400 μm, which ensures that there exists a detectable coupled capacitance between the signal emitting electrode 731 and the signal receiving electrode. 732, and also ensures that after the substrate 75 receives pressure, the height of the longitudinal section of the touch position markedly decreases relative to that of the non-touch position.

Figure 19:
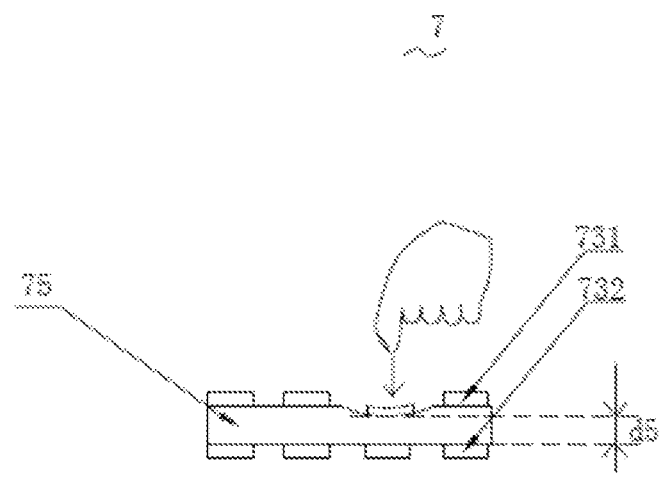
FIG. 19 is a cross-sectional view of the touch 3D-signal input equipment after deformed according to at least one embodiment of the present disclosure.

Reference is made to FIG. 18 and FIG. 19. When there is no external pressure, the touch 3D-signal input equipment 7 is flat, and the distance between the signal emitting electrode 731 and the signal receiving electrode 732 is substantially the same as the thickness d4 of the substrate 75. When an external pressure is applied to the touch 3D-signal input equipment 7, the substrate 75 is deformed, and because the substrate 75 is made of soft material, the distance between two opposite surfaces of the substrate 75 changes at the touch position. After touch 3D-signal input equipment 7 undergoes pressure, the distance between the signal emitting electrode 731 and the signal receiving electrode 732 turns into distance d5. According to the capacitance formula in physics: $C=KS/d$, wherein K is dielectric constant, S is relative area between two parallel plates, and d is distance between two parallel plates, it is noted that when K and S are constant, if d changes, the corresponding capacitance C also changes. In a soft substrate, capacitance C and distance d are in a linear relationship. The system detects the capacitance variation of the corresponding signal sensing units by predetermined formulas to determine a touch position. Therefore, it is possible to detect touch position and pressure magnitude at the same time, achieving 3D-signal input, and increasingly providing better experience to the user of the capacitance touch detecting panel.

In the above embodiments, whether using resistive detection principle or capacitive detection principle touch 3D-signal input equipment the object that applies touch is not limited to a conductor. When using a conductor (e.g. human finger) for touching, it is better to add a shielding layer between a capacitive detection principle touch 3D-signal input equipment and a conductor that applies touch to prevent the capacitance from being affected by the conductor.

Figure 20:
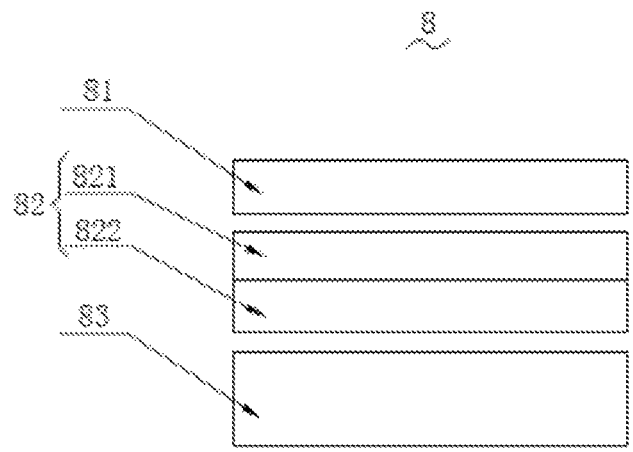
FIG. 20 is a layer structure view of a fingerprint recognition touch panel according to at least one embodiment of the present disclosure.

Reference is made to FIG. 20. FIG. 20 is a multi-function panel 8 made of any one of the touch 3D-signal input equipment of the present disclosure. The multi-function panel 8 includes, from top to bottom, a protective shield 81, a biological recognition system 82 and any one of the touch 3D-signal input equipment 83 of the described embodiments. The three components are adhered to each other by an optical cement. Because the determination of a touch position and a pressure magnitude of the touch 3D-signal input equipment 83 is not affected by the properties of the signal input object, both conductor and non-conductor can induce shape deformation of a system, thereby determining the touch position and the pressure magnitude by an internal circuit. Therefore, in the touch 3D-signal input equipment 83, the biological recognition system 82, which requires much more sensitivity to a signal input object, can be disposed in a position that is much closer to the signal input object in the touch panel (e.g. the position that is much closer to the protective shield 81), thereby achieving the biological recognition of strength application object and avoiding affecting the determination of 3D-signals. In some embodiments, when the strength application object is a conductor (e.g. human finger) and the touch 3D-signal input equipment 83 also uses a capacitive detection principle, it is better to scan the biological recognition system 82 and the touch 3D-signal input equipment 83 sequentially. While scanning the touch 3D-signal input equipment 83, the biological recognition system 82 is switched to pound and acts as a shielding layer between the conductor and the touch 3D-signal input equipment 83. Furthermore, the capacitance of the touch 3D-signal input equipment 83 is prevented from being affected by the conductor accordingly.

In some embodiments, the biological recognition system 82 can be a fingerprint recognition system, which includes a fingerprint recognition electrode layer 822 and is disposed on a first transparent layer 821. The fingerprint recognition electrode layer 822 can be a single unit or multiple structures, which includes several interleaved sensing, electrode wires, the width of each electrode wire ranging from 0.1 μm to 100 μm, and the distance between each two adjacent electrode wires ranging from 30 μm to 200 μm.

The biological recognition system 82 can be formed on a bottom surface of the protective shield 81 by a thin film transfer process. For example, the thin film transfer process includes the following steps: a carrier substrate (not shown) is provided. A first transparent layer 821 (e.g. polyimide thin film on the carrier substrate) is formed, and a fingerprint recognition electrode layer 822 is formed on the first transparent layer 821. At this time, the first transparent layer 821 is present between the carrier substrate and the fingerprint recognition electrode layer 822. A transfer layer (not shown) is formed, e.g. a one-sided cement on the fingerprint recognition electrode layer 822. Then the carrier substrate is removed. The fingerprint recognition electrode layer 822, the first transparent layer 821, and the transfer layer are adhered together on the protective shield 81 by the optical cement; at this time, the first transparent layer 821 and the fingerprint recognition electrode layer 822 are present between the optical cement and the transfer layer. Then the transfer layer is removed. As a result, the fingerprint recognition electrode layer 822, together with the first transparent layer 821, are formed on the protective shield 81 by the optical cement. It is noted that in some embodiments, the fingerprint recognition electrode layer 822 and the first transparent layer 821 are adhered to the protective shield 81 from one side of the first transparent layer 821, such that the first transparent layer 821 is present between the fingerprint recognition electrode layer 822 and the optical cement.

In some embodiments, the material of the first transparent layer 821 is polyimide, which can be formed by coating solution followed by solidifying, or other suitable processes. Comparing to a common substrate, the width of the first transparent layer 821 may be much thinner, which can range from 0.1 μm to 15 μm, or range from 2 μm to 5 μm.

The described thin film transfer process is applied to form the fingerprint recognition electrode layer 822 and the first transparent layer 821 on the protective shield 81. Because the first transparent layer 821 is very thin, the fingerprint recognition electrode layer 822 is formed on the first transparent layer 821, which is supported by the carrier substrate. Then, the carrier substrate is removed. Moreover, through transferring by the transfer layer, the first transparent layer 821 and the fingerprint recognition electrode layer 822 are adhered to the protective shield 81, reducing the entire thickness of the multi-function touch panel 8.

The aforementioned multi-function touch panel 8 includes 3D touch sensing input and fingerprint recognition functions, achieving several applications such as fingerprint recognition and multiple position 3D touch input, and provides a better experience to the user.

Figure 21:
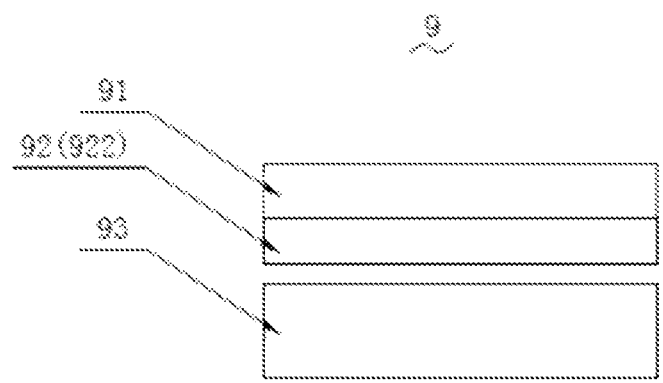
FIG. 21 is another layer structure view of a fingerprint recognition touch panel according to at least one embodiment of the present disclosure.

Reference is made to FIG. 21. FIG. 21 is a multi-function touch panel 9 constructed by any one of the touch 3D-signal input equipment of the present disclosure. The multi-function touch panel 9, from top to bottom, includes a protective shield 91, a biological recognition system 92, and a touch 3D-signal input equipment 93, in which the biological recognition system 92 and the touch 3D-signal input equipment 93 are adhered to each other by an optical cement. The differences between this configuration and the multi-function touch panel 8 include that the biological recognition system 92 includes only one fingerprint recognition layer 922, and the fingerprint recognition layer 922 is directly formed on the protective shield 91. Forming the biological recognition system 92 directly on the protective Shield can reduce product thickness, achieving thin and light products.

Figure 22:
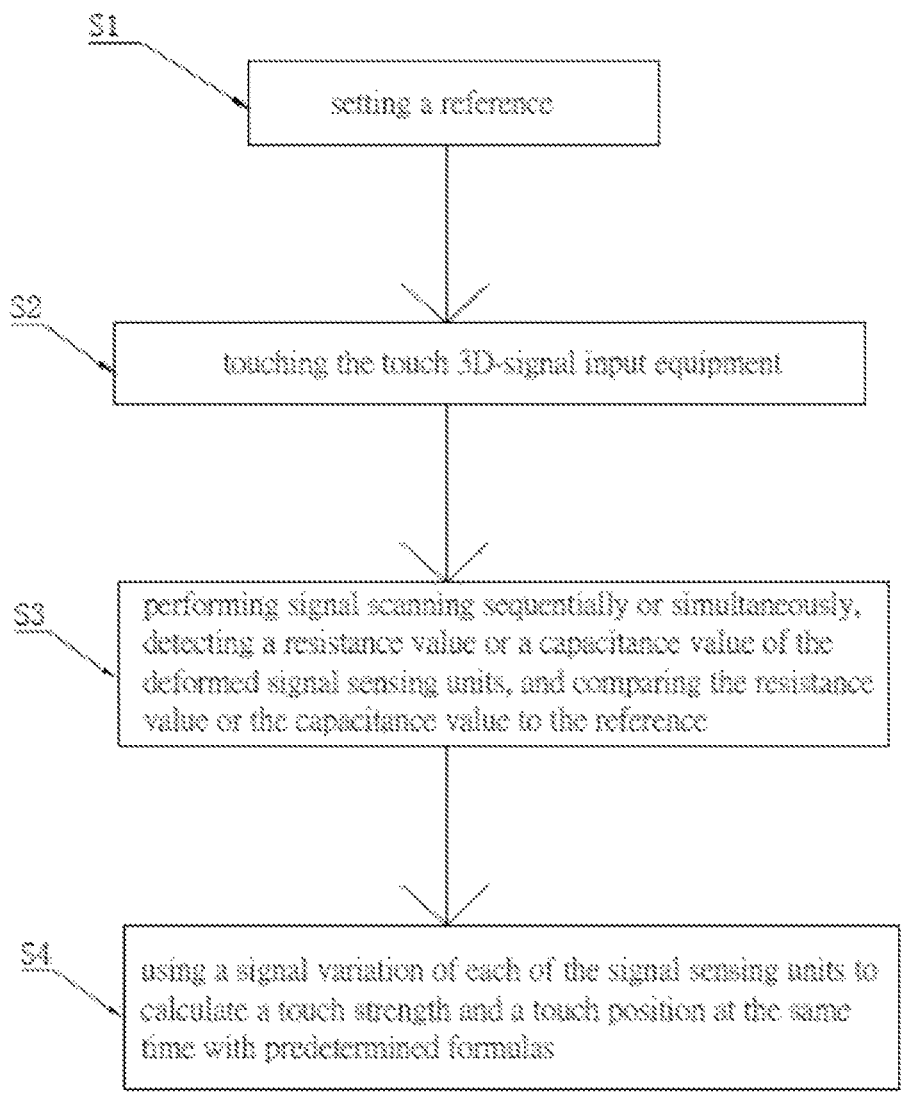
FIG. 22 is a flow chart of detecting a 3D-signal of a touch 3D-signal input equipment according to the present disclosure.

Reference is made to FIG. 22. The 3D-signal detecting method of the touch 3D-signal input equipment 1 of the present disclosure includes the following steps:

Step S1: A reference is set. After touching, the detected value is compared to the reference and the variation is calculated. When a resistive touch sensing principle is applied, since the resistive touch sensing is based on the calculation of resistance variation, the reference is the initial resistance of the signal sensing unit 131.

Step S2: An external touch is applied. The shape of the touch 3D-signal input equipment 1 has various deformation types according to different materials of the substrate 11. For example, when the substrate 11 is a flexible substrate, after external touching, only the touch position will be recessed. According to the capacitance variation after deformation, the system determines a touch position and a pressure magnitude.

Step S3: Signal scanning is applied. Signal scanning is sequentially or simultaneously performed on each of the signal sensing units, then a signal detected value is obtained, and the signal detected value is compared to the reference. In resistive touch sensing, after touching, the signal sensing units around the touch position are deformed, and the resistance of the signal sensing unit changes correspondingly. The detecting circuit detects the resistance value of the signal sensing units by signal scanning, and compares the resistance variation to the reference and calculates the resistance variation. On the other hand, in the capacitive touch sensing, after touching, the distance between the signal emitting electrode and the signal receiving electrode in the signal sensing units starts to change, and the coupled capacitance value also changes correspondingly. The detecting circuit detects the capacitance value of the signal sensing units by signal scanning, and compares the capacitance variation to the reference and calculates the capacitance variation.

Step S4: Pressure magnitude and touch position are calculated. The electrical signal variations of the signal sensing units are summed or averaged to obtain a pressure magnitude. Meanwhile, according to each variation magnitude and relative position, a touch position is calculated by specific formulas.

Compared to current technologies, in the touch 3D-signal input equipment 1 of the present disclosure, a signal sensing layer 13 is formed on a substrate 11, in which the signal sensing layer 13 includes several signal sensing units 131, and each of the signal sensing unit 131 is connected to a signal processing unit by an input wire 133 and an output wire 135. Since the received signal is processed and determined by the signal processing unit, which can simultaneously detect 3D-signal (touch position and pressure magnitude), achieving a combination of touch sensing and pressure sensing that not only saves materials but also extends product function, thereby providing better experience to the user.

The aforementioned way for detecting 3D-signal by the signal sensing layer can be separated into resistive type and capacitive type according to the detection principle. In a resistive touch sensing, the deformation in the signal sensing units induces corresponding resistance variation, and then a touch position and a pressure magnitude can be determined according to the position of resistance variation and the magnitude of the resistance variation; in capacitive touch sensing, through detecting the deformation-induced capacitance variation between two corresponding electrodes in the signal sensing units, the touch position and the pressure magnitude can be determined. Both types of detection implement not only position detecting calculation (2D plane) but also pressure detecting calculation (the third dimension), achieving simultaneous 3D detection. Both resistive and capacitive touch sensing can use a flexible substrate or a non-flexible substrate, two different types of deformation corresponding to different system detecting methods and calculating rules.

The present disclosure based on the above content, further adds a biological recognition structure, which can increasingly improve experience to the user and will not interfere with the signal transmission of the biological recognition structure and the touch 3D-signal input equipment.

The foregoing descriptions are merely preferred embodiments, and are not intended to limit the present disclosure. Those skilled in the art should realize that equivalent constructions do not depart from the spirit and scope of the present disclosure, and that various changes, substitutions, and alterations may be made herein without departing from the spirit and scope of the present disclosure.

What is claimed is:
1. A touch 3D-signal input equipment, comprising:
a substrate;
a detecting chip; and
a plurality of signal sensing units arranged in array on the substrate, wherein:

each of the plurality of signal sensing units has a set of coordinates and a predetermined reference corresponding thereto, each of the plurality of signal sensing units is electrically connected to the detecting chip, and the plurality of signal sensing units generate a plurality of electrical signals in response to a touch point;

wherein the detecting chip compares the plurality of electrical signals with the predetermined references corresponding to the plurality of signal sensing units to generate a plurality of signal variations, determines a pressure magnitude of the touch point according to a sum or average calculation of the plurality of signal variations and determines a position of the touch point according to the plurality of signal variations and the sets of coordinates corresponding to the plurality of signal sensing units.

2. The touch 3D-signal input equipment of claim 1, wherein a size of the signal sensing units ranges from 25 mm$^2$ to 225 mm$^2$.

3. The touch 3D-signal input equipment of claim 1, wherein the plurality of signal sensing units generate the plurality electrical signals by detecting a resistance change of the touch point induced by deformation.

4. The touch 3D-signal input equipment of claim 3, wherein the signal sensing units are arranged in radiative shape, jagged shape, or flower shape.

5. The touch 3D-signal input equipment of claim 3, wherein the signal sensing units are formed by a bended wire, and a width of the bended wire ranges from 3 μm to 500 μm.

6. The touch 3D-signal input equipment of claim 1, wherein the plurality of signal sensing units generate the plurality of electrical signals by detecting a capacitance change of the touch point induced by deformation.

7. The touch 3D-signal input equipment of claim 6, wherein each of the signal sensing units comprises a signal emitting electrode and a signal receiving electrode, and the signal emitting electrode and the signal receiving electrode are present on a same surface of the substrate.

8. The touch 3D-signal input equipment of claim 7, wherein a shape of the signal sensing units is a combination of two triangles or a cross-comb.

9. The touch 3D-signal input equipment of claim 7, wherein the signal emitting electrode and the signal receiving electrode have a distance therebetween, and the distance ranges from 5 μm to 20 μm.

10. The touch 3D-signal input equipment of claim 7, wherein the signal emitting electrode and the signal receiving electrode are present on opposite sides of the substrate, respectively.

11. The touch 3D-signal input equipment of claim 10, wherein a size of the signal emitting electrode and a size of the signal receiving electrode both range from 25 mm$^2$ to 225 mm$^2$.

12. The touch 3D-signal input equipment of claim 10, wherein a vertical projection of the signal emitting electrode and a vertical projection of the signal receiving electrode mutually overlap.

13. The touch 3D-signal input equipment of claim 1, wherein the detecting chip comprises a touch position detecting circuit and a touch strength detecting circuit, wherein the touch position detecting circuit and the touch strength detecting circuit detect and process the electrical signals simultaneously, and thereby obtain the position of the touch point and the pressure magnitude, respectively.

14. The touch 3D-signal input equipment of claim 1, wherein: the substrate is a protective shield, and the signal sensing units are present on a surface of the substrate away from a touch surface.

15. The touch 3D-signal input equipment of claim 1, wherein the touch 3D-signal input equipment further comprises a plurality of input wires and a plurality of output wires, wherein each of the plurality of signal sensing units is electrically connected to the detecting chip through a corresponding one of the plurality of input wires and a corresponding one of the plurality of output wires.

16. A method of using a touch 3D-signal input equipment, the method comprising:

performing signal scanning sequentially or simultaneously on a plurality of signal sensing units, wherein each of the plurality of signal sensing units has a set of coordinates and a predetermined reference corresponding to, generating a plurality of electrical signals from the plurality of signal sensing units in response to a touch point, and comparing the plurality of electrical signals with the predetermined references corresponding to the plurality of signal sensing units to generate a plurality of signal variations; and simultaneously determining a pressure magnitude of the touch point according to a sum or average calculation of the plurality of signal variations and determining a position of the touch point according to the plurality of signal variations and the sets of coordinates corresponding to the plurality of signal sensing units.

* * * * *